US007940682B2

(12) United States Patent
Qian et al.

(10) Patent No.: US 7,940,682 B2
(45) Date of Patent: May 10, 2011

(54) SYSTEMS CONFIGURED TO AUTOMATICALLY IDENTIFY OPEN SHORTEST PATH FIRST (OSPF) PROTOCOL PROBLEMS IN A NETWORK AND RELATED COMPUTER PROGRAM PRODUCTS AND METHODS

(75) Inventors: Zhiqiang Qian, Holmdel, NJ (US); Paritosh Bajpay, Edison, NJ (US); Jackson Liu, Middletown, NJ (US); Michele Macauda, Monroe, CT (US); Michael Zinnikas, North Brunswick, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 164 days.

(21) Appl. No.: 12/335,047

(22) Filed: Dec. 15, 2008

(65) Prior Publication Data
US 2010/0149994 A1 Jun. 17, 2010

(51) Int. Cl.
*H04J 1/16* (2006.01)
(52) U.S. Cl. .................. 370/248; 370/242; 370/244
(58) Field of Classification Search ............ 370/242, 370/401, 244, 248
See application file for complete search history.

(56) References Cited

U.S. PATENT DOCUMENTS

| 5,159,685 A | 10/1992 | Kung |
| 5,483,637 A | 1/1996 | Winokur et al. |
| 6,662,221 B1 | 12/2003 | Gonda et al. |
| 6,775,239 B1 * | 8/2004 | Akita et al. ............... 370/248 |
| 6,781,959 B1 | 8/2004 | Garakani et al. |
| 7,010,718 B2 | 3/2006 | Ogawa et al. |
| 7,257,741 B1 | 8/2007 | Palenik et al. |
| 7,272,146 B2 * | 9/2007 | Yamauchi ............... 370/395.53 |
| 7,420,927 B1 | 9/2008 | Garakani et al. |
| 7,522,603 B2 * | 4/2009 | Vasseur ...................... 370/392 |
| 7,694,338 B1 * | 4/2010 | Jafari et al. ................ 726/22 |
| 2003/0065967 A1 | 4/2003 | Garcia et al. |
| 2004/0066747 A1 | 4/2004 | Jorgensen et al. |
| 2005/0050096 A1 | 3/2005 | Gomes et al. |
| 2005/0111375 A1 * | 5/2005 | Ravindran et al. ........... 370/252 |
| 2006/0029075 A1 | 2/2006 | Sheppard et al. |

(Continued)

OTHER PUBLICATIONS

Cisco; ("Troubleshooting OSPF") 200; Cisco; pp. 1-42.*

(Continued)

*Primary Examiner* — Ricky Ngo
*Assistant Examiner* — Dewanda Samuel
(74) *Attorney, Agent, or Firm* — Myers Bigel Sibley & Sajovec, P.A.

(57) ABSTRACT

A data communications system may include a network having a plurality of network provider routers configured to support Open Shortest Path First (OSPF) circuits between customer edge routers outside the network, an automated diagnostic system coupled to the network provider routers. The automated diagnostic system may be configured to automatically initiate one or more inquiries of one or more of the network provider routers in response to a customer IP address identifying a customer edge router servicing a customer location from which a service failure has been reported and a circuit address identifying an Open Shortest Path First (OSPF) circuit related to the reported service failure. In addition, the automated diagnostic system may be configured to automatically process results of the one or more inquiries to automatically identify whether an Open Shortest Path First (OSPF) protocol problem is present in the network, and to automatically generate a notification for a work center when an Open Shortest Path First (OSPF) problem is identified in the network. Related computer program products and methods are also discussed.

17 Claims, 5 Drawing Sheets

U.S. PATENT DOCUMENTS

| | | |
|---|---|---|
| 2006/0075094 A1 | 4/2006 | Wen et al. |
| 2006/0114838 A1* | 6/2006 | Mandavilli et al. ........... 370/254 |
| 2006/0198310 A1 | 9/2006 | Stieglitz et al. |
| 2008/0159154 A1 | 7/2008 | Bajpay et al. |

OTHER PUBLICATIONS

Coltum et al., RFC5340, "OSPF for IPv6" retrieved from http://www.faqs.org/rfcs/rfc5340.html, pp. 1-84, retrieved Nov. 13, 2008.

Definition of OSPF retrieved from http://searchtelecom.techtarget.com/sDefinition/0,,sid103_gci212728,00.html ,pp. 1-2, retrieved on Nov. 13, 2008.

"EIGRP to OSPF Migration Strategies" Juniper Networks, Inc., pp. 1-9 (2005).

McQuerry "Implementing EIGRP", Cisco Press, Jun. 11, 2008, retrieved from http://www.ciscopress.com/articles/article.asp?p=1171169&segNum=3, 7 pages, retrieved on Dec. 9, 2008.

OSPF Database Explanation Guide, Document ID 16437, Aug. 10, 2005.

"OSPF Commands" Network Protocols Command Reference, Part 1, P1R-228 to P1R-300.

"Open Shortest Path First" Wikipedia, retrieved from http://en.wikipedia.org/wiki/Open_Shortest_Path_First, retrieved Nov. 13, 2008, pp. 1-13.

"Open Shortest Path First (OSPF)", Introduction, Cisco Systems, retrieved from http://www.cisco.com/en/US/tech/tk365/tk480/tsd_technology_support_sub-protocol_ho..., 4 pages, retrieved on Nov. 13, 2008.

Shamim, "What Does the show ip ospf neighbor Comman Reveal?" Cisco, Document ID 13688, Aug. 8, 2005, pp. 1-3.

Shamin, "What Does the show ip ospf interface Command Reveal?"Cisco, Document ID 13689, Aug. 10, 2005, pp. 1-6.

"Troubleshooting EIGRP" retrieved from http://www.cisco.com/en/US/tech/tk365/technologies_tech_note09186a0080094613.shtml, 8 pages retrieved on Dec. 9, 2008.

Moy, RFC2328, "OSPF Version 2" Ascend Communications, Inc., pp. 1-244, (1998).

"Open Shortest Path First v3" Cisco Systems, pp. 1-93, (2002).

* cited by examiner

SYSTEMS CONFIGURED TO AUTOMATICALLY IDENTIFY OPEN SHORTEST PATH FIRST (OSPF) PROTOCOL PROBLEMS IN A NETWORK AND RELATED COMPUTER PROGRAM PRODUCTS AND METHODS

BACKGROUND

The present disclosure relates generally to the field of networks, and more particularly, to methods of diagnosing network problems and to related systems and computer program products.

Enterprise customers are increasingly adopting multiprotocol label switching (MPLS) based virtual private network (VPN) services to implement a communications network among their respective customer sites using a service provider's network. Such MPLS-based VPN's may provide direct any-to-any reachability among an enterprise's customer sites. An enterprise customer may, for example, deploy voice over Internet Protocol (VoIP) services and/or local area network (LAN) based data services to their customer sites via their respective VPN. For example, the Open Shortest Path First (OSPF) protocol is a dynamic routing protocol that is used in Internet Protocol (IP) networks. The OSPF protocol is discussed, for example, in the white paper published by Juniper Networks, Inc. entitled "EIGRP to OSPF Migration Strategies," pages 1-9, 2005.

SUMMARY

It should be appreciated that this summary is provided to introduce a selection of concepts in a simplified form, the concepts being further described below in the Detailed Description. This summary is not intended to identify key features or essential features of this disclosure, nor is it intended to limit the scope of the invention.

According to some embodiments, a data communications system may include a network including a plurality of network provider routers configured to support Open Shortest Path First (OSPF) circuits between customer edge routers outside the network and an automated diagnostic system coupled to the network provider routers. The automated diagnostic system may be configured to automatically initiate one or more inquiries of one or more of the network provider routers in response to a customer IP address identifying a customer edge router servicing a customer location from which a service failure has been reported and a circuit address identifying an OSPF circuit related to the reported service failure. The automated diagnostic system may be further configured to automatically process results of the one or more inquiries to automatically identify whether an OSPF protocol problem is present in the network, and to automatically generate a notification for a work center when an OSPF problem is identified in the network. The automated diagnostic system may also be configured to automatically initiate one or more inquiries of one or more of the network provider routers by automatically initiating one or more OSPF Show commands with respect to the one or more routers of the network.

According to some other embodiments, a computer program product may be configured to identify an Open Shortest Path First (OSPF) protocol problem in a network including an automated diagnostic system coupled to provider routers of the network. The computer program product may include a computer useable storage medium having computer-readable program code embodied in the medium. The computer-readable program code may include computer-readable program code that is configured to automatically initiate at the automated diagnostic system one or more inquiries of one or more routers of the network in response to a customer IP address identifying a customer edge router servicing a customer location from which a service failure has been reported and a circuit address identifying an OSPF circuit related to the reported service failure. The computer-readable program code may be configured to automatically process results of the one or more inquiries at the automated diagnostic system to automatically identify whether an OSPF protocol problem is present in the network. The computer-readable program code may be configured to automatically generate a notification at the automated diagnostic system for a work center when an OSPF problem is identified in the network. In addition, the computer-readable program code may be configured to automatically initiate one or more inquiries of one or more routers of the network by automatically initiating at the automated diagnostic system one or more OSPF Show commands with respect to the one or more routers of the network.

According to still other embodiments, a method of automatically identifying an Open Shortest Path First (OSPF) protocol problem in a network including an automated diagnostic system coupled to provider routers of the network may be provided. The method may include automatically initiating at the automated diagnostic system one or more inquiries of one or more routers of the network in response to a customer IP address identifying a customer edge router servicing a customer location from which a service failure has been reported and a circuit address identifying an OSPF circuit related to the reported service failure. Results of the one or more inquiries may be automatically processed at the automated diagnostic system to automatically identify whether an OSPF protocol problem is present in the network. A notification may be automatically generated at the automated diagnostic system for a work center when an OSPF problem is identified in the network. Automatically initiating one or more inquiries of one or more routers of the network may include automatically initiating at the automated diagnostic system one or more OSPF Show commands with respect to the one or more routers of the network.

Other systems, methods, and/or computer program products will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

Figure 1:
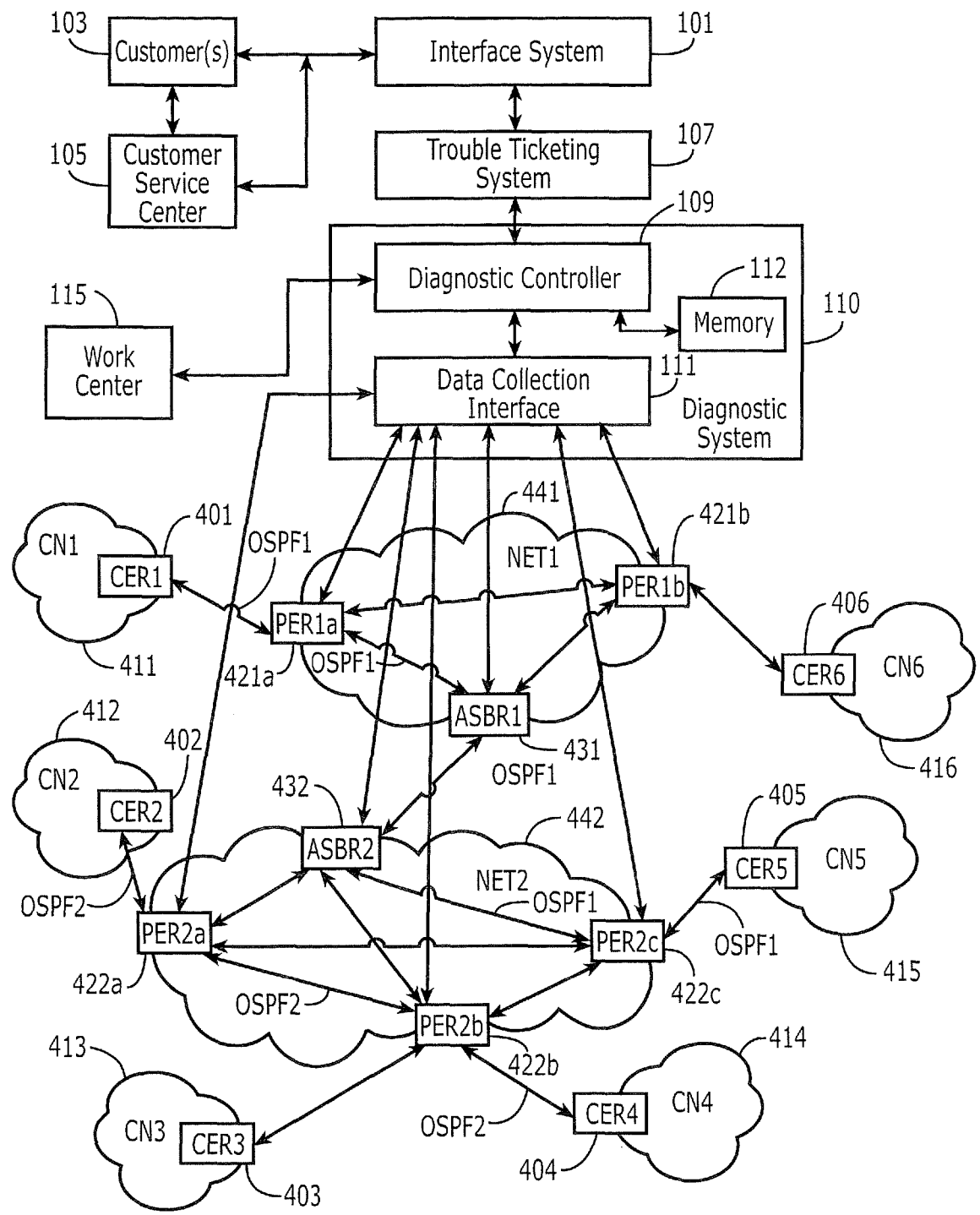
FIG. 1 is a block diagram illustrating embodiments of systems that are configured to automatically identify OSPF protocol problems in a network.

Illustrative embodiments will be described more fully hereinafter with reference to the accompanying drawings. Embodiments may, however, be provided in many different forms and should not be construed as limited to the embodiments set forth herein; rather, these embodiments are provided so that this disclosure will be thorough and complete, and will fully convey the scope of this disclosure to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first network element (such as a first router) could be termed a second network element, and, similarly, a second network element (such as a second router) could be termed a first network element without departing from the teachings of the disclosure.

Unless otherwise defined, all terms (including technical and scientific terms) used herein have the same meaning as commonly understood by one of ordinary skill in this art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, embodiments may be provided as methods, computing systems, and/or computer program products. Accordingly, embodiments may take the form of an entirely hardware embodiment, an entirely software embodiment (including firmware, resident software, micro-code, etc.) or an embodiment combining software and hardware aspects. Furthermore, embodiments may take the form of a computer program product on a computer-usable storage medium having computer-usable program code embodied in the medium. Any suitable computer readable medium may be utilized including hard disks, CD-ROMs, optical storage devices, or magnetic storage devices. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments may be written, for example, in an object oriented programming language such as JAVA®, Smalltalk, and/or C++. However, the computer program code for carrying out operations of embodiments may also be written in conventional procedural programming languages, such as the "C" programming language or in a visually oriented programming environment, such as VisualBasic.

Embodiments are described in part below with reference to block diagrams of methods, systems and/or computer program products. It will be understood that each block of the illustrations, and combinations of blocks, can be implemented by computer program instructions. These computer program instructions may be provided to a processor of a general purpose computer, special purpose computer, or other programmable computing apparatus to produce a machine, such that the instructions, which execute via the processor of the computer or other programmable computing apparatus, create means for implementing the functions/acts specified in the block or blocks.

These computer program instructions may also be stored in a computer-readable memory that can direct a computer or other programmable computing apparatus to function in a particular manner, such that the instructions stored in the computer-readable memory produce an article of manufacture including instruction means which implement the function/act specified in the block or blocks.

The computer program instructions may also be loaded onto a computer or other programmable computing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 is a block diagram illustrating embodiments of methods, systems, and computer program products that may be used by a network service provider to automatically diagnose Open Shortest Path First (OSPF) problems in an Internet Protocol (IP) network or networks (e.g., NET1 441 and/or NET2 442) operated by the network service provider. As shown in FIG. 1, an interface system 101 may provide an interface between customer(s) 103 of the network service provider, customer service center 105, and/or a trouble ticketing system 107. In response to information provided by a customer(s) 103 using interface system 101 and/or customer service center 105, trouble ticketing system 107 may initiate trouble shooting using diagnostic system 110 including diagnostic controller 109 and data collection interface 111. More particularly, data collection interface 111 may query routers of the network service provider (e.g., networks 441 and 442) to collect information used by diagnostic controller 109 to diagnose network problems. In addition, diagnostic system 110 and/or diagnostic controller 109 may include memory 112 having a computer-readable storage medium storing a computer program product including computer-readable program code configured to provide instructions used by diagnostic controller 109 to operate diagnostic system 110 as discussed in greater detail, for example, below with respect to FIG. 2.

Accordingly, a network service provider may use customer service center 105, interface system 101, trouble ticketing system 107, diagnostic controller 109, and data collection interface 111 to diagnose OSPF problems in networks 441 and 442 operated by the network service provider. Network 441, for example, may include provider edge routers (e.g., PER1a 421a and PER1b 421b) providing data communications with customer edge routers (e.g., CER1 and CER6) of respective customer networks (e.g., CN1 411 and CN6 416), and autonomous system boundary router (e.g., ASBR1 431) providing data communications with an autonomous system boundary router (e.g., ASBR2 432) of another network (e.g., network 442). Network 442, for example, may include provider edge routers (e.g., PER2a 422a, PER2b 422b, and PER2c 422c) providing data communications with customer edge routers (e.g., CER2, CER3, CER4, and CER5) of respective customer networks (e.g., CN2 412, CN3 413, CN4 414, and CN5 415), and autonomous system boundary router (e.g., router 432) providing data communications with an autonomous system boundary router (e.g., router 431) of another network (e.g., network 441). Network 441, for example, may be a High Speed Packet Services (HSPS) network, and Network 442 may be a Multi-Protocol Label Switching (MPLS) network.

By way of example, diagnostic system 110 (including diagnostic controller 109 and data connection interface 111) may diagnose an OSPF problem by automatically performing one or more tests of one or more routers (e.g., routers 421a, 421b, 431, 422a, 422b, 422c, and/or 432) of the IP network(s) (e.g., network 441 and/or 442) in response to a trouble ticket submitted by trouble ticketing system 107. Results of the one or more tests may be automatically processed by diagnostic system 110 to automatically identify whether an OSPF problem is present in the IP network(s) (e.g., network 441 and/or 442). If an OSPF problem is diagnosed in the IP network(s) (e.g., network 441 and/or 442), diagnostic system 110 may then automatically assign the trouble ticket to a work center 115, and a technician may be dispatched/assigned from work center 115 to correct the problem using diagnostic information automatically provided by the diagnostic system 110. If it is determined that there is no OSPF problem present in the IP network(s) (e.g., network 441 and/or 442), the trouble ticket may be automatically closed out and/or reported.

Internet Protocol (IP) network service provider may support Open Shortest Path First Protocol (OSPF) for services such as Virtual Private Network (VPN). The OSPF protocol can learn least/reduced cost routes from neighboring OSPF routers and route IP traffic in a shortest/reduced path to its destination. Each OSPF router may thus maintain an identical OSPF database (also referred to as a Link State or LS database) and may build an SPF (shortest path first) tree based on a shortest path first algorithm. Accordingly, OSPF routing may be relatively complicated because it depends on formation of adjacencies, databases, and sophisticated network configurations. The OSPF protocol is discussed, for example, by J. Moy in "Request For Comments: OSPF Version 2," Request For Comments (RFC) 2328, pages 1-244, April 1998; by R. Coltun et al. in "Request For Comments: OSPF for IPv6," Request For Comments (RFC) 5340, pages 1-84, July 2008, the disclosures of which are hereby incorporated herein in their entireties by reference. A difficulty of IP network troubleshooting may thus increase and/or downtime may increase if manual troubleshooting is required.

More particularly, the OSPF protocol may be used to provide Virtual Private Network (VPN) couplings between different customer locations. For example, a first OSPF link OSPF1 may provide a Virtual Private Network (VPN) link between customer networks 411 and 415 operated by a same customer in different locations. More particularly, OSPF link OSPF1 may be provided between customer edge routers CER1 and CER5 through routers 421a, 431, 432, and 422c of networks 441 and 442. A second OSPF link OSPF2 may provide a Virtual Private Network (VPN) link between customer networks 412 and 414 operated by a same customer in different locations. More particularly, OSPF link OSPF2 may be provided between customer edge routers CER2 and CER4 through routers 422a and 422b of network 442.

According to some embodiments, automated diagnostic system 110 (including diagnostic controller 109 and/or automated data collection interface 111) may be configured to:

Automatically check physical layer and/or protocol problems using a Show IP interface command(s);

Automatically check OSPF logical channel status and/or protocol status using a Show IP OSPF interface command(s);

Automatically analyze OSPF settings to locate mismatches;

Automatically scrutinize OSPF neighbors to check neighbor adjacencies using a Show IP OSPF neighbor command(s);

Automatically analyze an OSPF database(s) to check OSPF routes and Areas using a Show IP OSPF database command(s);

Automatically examine neighbor connection status including two-way state, initiate state, etc.;

Automatically trace neighbor interfaces that have not responded; and

Automatically move a trouble ticket to an appropriate work center 115 or auto-close ticket if no problem is found.

Some embodiments may thus promote "Zero Touch" service assurance automation, reduce MTTR (Mean Time To Repair/Replace), improve operations efficiency, improve customer satisfaction (by providing value-added services), and/or enable a network service provider to maintain a client base while winning over new customers.

Embodiments will now be discussed with respect to the flow chart of FIG. 2. While operations of the flow chart of FIG. 2 may be discussed, by way of example, with respect to diagnostic system 110, diagnostic controller 109, and/or data connection interface 111, functionalities of diagnostic controller 109 and data collection interface 111 may be combined and/or separated into additional blocks. Moreover, various OSPF commands are used to collect information from the network provider routers. OSPF commands are discussed, by way of example, by J. Moy in "Request For Comments: OSPF Version 2," pages 1-244, April 1998; by R. Coltun et al. in "Request For Comments: OSPF for IPv6," pages 1-84, July 2008; in "OSPF Commands, Network Protocols Command Reference," Part 1, pages P1R-228 to P1R-300; by S. Shamim in "What Does The Show IP OSPF Interface Command Reveal?" Document ID 13689, Aug. 10, 2005; and by S. Shamim in "What Does The Show IP OSPF Neighbor Command Reveal?", Document ID 13688, Aug. 8, 2005. The disclosures of all of the above referenced documents are hereby incorporated herein in their entirety by reference as if set forth fully herein.

Diagnostic operations will be discussed, by way of example, with respect to OSPF link OSPF2 providing a Virtual Private Network (VPN) link between customer networks 412 and 414 through routers 422a and 422b of network 442. If the customer 103 (operating customer networks 412 and 414) experiences a disruption of service, the customer may report the problem using customer service center 105 and/or interface system 101. The customer, for example, may report the problem telephonically (or in another manner such as in an e-mail) to a customer service representative at customer service center 105, and the customer service representative may enter information regarding the problem into the interface system 101. Alternatively, the customer may enter the information regarding the problem directly into the interface system 101 using an automated interactive voice response (IVR) system, or the customer may enter the information regarding the problem directly into the interface system 101 using a graphical user interface provided over a network connection.

No matter how the information regarding the problem is provided to the interface system 101, sufficient information is provided to identify the customer reporting the problem (e.g., a customer IP address for the customer edge router where the problem has been reported) and the circuit (e.g., VPN service) that has been disrupted (e.g., the circuit address for the OSPF circuit supporting the VPN service). In the above example where the disruption of service occurs between customer networks 412 and 414 using OSPF circuit OSPF2, if the problem is reported from a location serviced by customer network 412, a customer IP address identifying customer edge router CER2 may be provided to interface system 101. If the problem is reported from a location serviced by customer network 414, a customer IP address identifying customer edge router CER4 may be provided to interface system 101. In the following discussion, it will be assumed that the problem is reported from a location serviced by customer network 412 (including customer edge router CER2).

The interface system 101 provides the information identifying the customer edge router CER2 where the problem has been reported (e.g., the customer IP address, also referred to as a process ID) and identifying the circuit that has been disrupted (e.g., the circuit address) to the trouble ticketing system 107. The trouble ticketing system then generates a trouble ticket that is provided to diagnostic controller 109 of diagnostic system 110 to thereby initiate automatic diagnostic analysis of the network elements in the affected circuit (e.g., OSPF2).

Operations of diagnostic system 110 will now be discussed in greater detail with respect to the flow chart of FIG. 2. Once information identifying the customer edge router where the problem has been reported (e.g., the customer IP address for CER2) and the circuit that has been disrupted (e.g., the circuit address for OSPF circuit OSPF2) has been provided to diagnostic controller 109 of diagnostic system 110, diagnostic system 110 may check a physical link status and a protocol status for the link between provider edge router 422a and customer edge router CER2 at block 201. More particularly, diagnostic controller 109 may instruct data collection interface 111 to run an OSPF Show interface command for an interface of provider edge router 422a coupled to customer edge router CER2, and the data collection interface 111 may return the results of the Show interface command to the diagnostic controller 109.

Using information obtained at block 201, diagnostic controller 109 may determine at block 203 if the link and/or protocol (e.g., physical layer and/or IP link) for OSPF circuit OSPF2 are down between provider edge router 422a and customer edge router CER2. If the link and/or protocol are determined to be down at block 203, diagnostic controller 109 may inform work center 115 at block 205 that a Layer 2 problem has been identified between provider edge router 422a and customer edge router CER2 so that further trouble shooting may be performed outside diagnostic system 110. Accordingly, diagnostic controller 109 may determine at block 203 if a physical link is down between routers 422a and CER2.

If the link and protocol between routers 422a and CER2 are determined to be up at block 203, diagnostic controller 109 may instruct data collection interface 111 to execute a Show IP OSPF interface command using a process ID and IP address identifying the customer and the OSPF circuit at block 207. At block 209, data collection interface 111 may collect the requested information relating to the interface of router 422a coupled to CER2 including link status, protocol status, adjacency, protocol, access type, and priority information.

At block 211, diagnostic controller 109 may determine if the link and/or protocol (e.g., OSPF link or protocol) for OSPF circuit OSPF2 are down between router 422a and CER2. If the link and/or protocol are determined to be down at block 211, diagnostic controller 109 may inform work center 115 at block 215 that a Layer 3 problem has been identified between router 422a and CER2 so that a Tier2 technician may be dispatched/assigned to verify OSPF and router configurations for router 422a and/or CER2. Accordingly, diagnostic controller 109 may determine at block 211 if a logical link is down between routers 422a and CER2.

If the link and protocol between routers 422a and CER2 are determined to be up at block 211, diagnostic controller 109 may determine if OSPF is enabled at the interface of router 422a that is coupled to CER2 at block 217. If the interface is determined to be not enabled at block 217, diagnostic controller 109 may inform work center 115 at block 215 that OSPF is not enabled at the interface of router 422a between router 422a and CER2 so that a technician may be dispatched/assigned to verify OSPF and router configurations.

If the interface is determined to be enabled at block 217, diagnostic controller 109 may determine if a passive interface is present for the interface of router 422a that is coupled to CER2 at block 219. If diagnostic controller 109 determines that a passive interface is present at block 219, diagnostic controller 109 may inform work center 115 at block 221 that the passive interface is present so that a Tier2 technician may be dispatched/assigned to reconfigure the passive interface.

If diagnostic controller 109 determines that an active interface is present at block 219 (for an interface of router 422a coupled to router 422b), diagnostic controller 109 may determine at block 223 if an adjacent neighbor count for router 422a is greater than a neighbor count limit. If diagnostic controller 109 determines at block 223 that an adjacent neighbor count is greater that a neighbor count limit at block 223, diagnostic controller may automatically inform work center 115 at block 225 that the adjacent neighbor count exceeds the neighbor count limit so that a Tier2 technician may be dispatched/assigned to check the OSPF configuration of the interface of router 422a coupled to CER2.

If diagnostic controller 109 determines that the adjacent neighbor count does not exceed the neighbor count limit at block 223, diagnostic controller 109 may instruct data collection interface 111 to execute a Show IP OSPF neighbor command using the process ID and IP address identifying the customer and the OSPF circuit, and the information obtained using the Show IP OSPF neighbor command may be provided to diagnostic controller 109 (block 227). More particularly, the Show IP OSPF neighbor command of block 227 may be performed for an interface of router 422a that is coupled to a next network router in the OSPF circuit. In the example using OSPF circuit OSPF2, the Show IP OSPF neighbor command of block 227 may be performed for an interface of router 422a that is coupled to provider edge router 422b.

At block 229, diagnostic controller 109 may determine if any dynamic neighbor links are present using information obtained from the Show IP OSPF neighbor command of block 227. If diagnostic controller 109 determines that no dynamic neighbor links are present at block 229, diagnostic controller 109 may instruct data collection interface 111 to execute a Show IP OSPF database command for an interface of router 422*a* that is coupled to router 422*b* using the Process ID and IP address identifying the customer and the OSPF circuit at block 231. Information obtained using the Show IP OSPF database command of block 231 is provided by data collection interface 111 to diagnostic controller 109. If diagnostic controller 109 determines at block 233 that no static neighbor links are present at the interface of router 422*a* (coupled to router 422*b*) based on information obtained using the Show IP OSPF database command (of block 231), diagnostic controller 109 may inform work center 115 at block 235 that no static neighbor links are detected so that a Tier2 technician may be dispatched/assigned to check OSPF network configurations.

If diagnostic controller 109 determines that static neighbor links are present at block 233, diagnostic controller 109 and/or data collection interface 111 may select other links at router 422*a* that have a same area as the link for circuit OSPF2 between router 422*a* and router 422*b* (e.g., links having a same network area as the link for circuit OSPF2 between router 422*a* and router 422*b*) at block 237. At block 239, diagnostic controller 109 and/or data collection interface 111 may execute Show IP OSPF interface commands using the process ID and IP address at the interface of router 422*a* coupled to router 422*b* for a plurality of the links (e.g., 5 links) selected at block 237. Accordingly, operations of blocks 237 and 239 may be used to check links from router 422*a* other than the link supporting circuit OSPF2 between router 422*a* and router 422*b*. If diagnostic controller 109 determines that all links and protocols are down at the interface of router 422*a* that is coupled to router 422*b* at block 241, diagnostic controller 109 may inform work center 115 that all links and protocols for the interface are down at block 243 so that at Tier2 technician may be dispatched/assigned to verify OSPF and router configurations for router 422*a*.

If diagnostic controller 109 determines that all links and protocols are not down at the interface of router 422*a* that is coupled to router 422*b* at block 241, diagnostic controller 109 may determine at block 245 if OSPF is enabled on the interface of router 422*a* that is coupled to router 422*b*. If diagnostic controller 109 determines at block 245 that OSPF is not enabled on the interface, diagnostic controller 109 may inform work center 115 that OSPF is not enabled on the interface at block 247 so that a Tier2 technician may be dispatched/assigned to verify OSPF and router configurations for the interface of router 422*a* that is coupled to router 422*b*.

If diagnostic controller 109 determines at block 245 that OSPF is enabled on the interface of router 422*a* (that is coupled to router 422*b*), diagnostic controller 109 may determine at block 249 if a passive interface is present at the interface of router 422*a* (that is coupled to router 422*b*). If diagnostic controller 109 determines that the passive interface is present at block 249, diagnostic controller 109 may inform work center 115 that the passive interface is present at block 251 so that a Tier2 technician may be dispatched/assigned to enable the neighbor connection by reconfiguring the passive interface.

If diagnostic controller 109 determines that an active interface (i.e., not the passive interface) is present at block 249, diagnostic controller 109 may be configured to compare OSPF database information for coupled interfaces of router 422*a* and router 422*b* at block 253. More particularly, diagnostic controller 111 may compare router ID's, area numbers, area types, subnet masks, and hello and dead values of the two interfaces. In a properly functioning system, router ID's of the two routers (e.g., router 422*a* and router 422*b*) should be different, while area numbers, area types, subnet masks, and hello and dead values should be the same for the coupled interfaces of the two routers. If the information used for the comparison of block 253 is not already available, diagnostic controller 109 and/or data collection interface 111 may execute a Show IP OSPF interface command(s) to obtain the information.

Diagnostic controller 109 may determine at block 255 if router ID's of the coupled interfaces of router 422*a* and router 422*b* are the same. If the router ID's are the same, diagnostic controller 109 may inform work center 115 that the router ID's are the same at block 257 so that a Tier2 technician may be dispatched/assigned. According to the OSPF protocol, unique router ID's should be assigned to each router of a network, and if a same router ID is assigned to two routers, formation of neighbor links therebetween may be prevented.

If the router ID's of router 422*a* and router 422*b* are not the same, diagnostic controller 109 may determine at block 259 if the other OSPF database information of the two interfaces that was compared is the same. More particularly, diagnostic controller 109 may determine if area numbers, area types, subnet masks, and hello and dead values of the coupled interfaces of router 422*a* and router 422*b* are the same. If diagnostic controller 109 determines that there is a mismatch at block 259, diagnostic controller 109 may inform work center 115 of the mismatch so that a Tier2 technician may be dispatched/assigned to verify an OSPF configuration problem. If diagnostic controller 109 determines that there is no mismatch at block 259, diagnostic controller 109 and/or data collection interface 111 may initiate a ping test between router 422*a* and router 422*b* at block 263. If the ping test is successful at block 265, diagnostic controller 109 may notify work center 115 of the successful test at block 261 so that a Tier2 technician may be dispatched/assigned to verify an OSPF configuration problem. If the ping test is not successful at block 265, diagnostic controller 109 may notify work center 115 of the unsuccessful ping test at block 267 so that a Tier2 technician may be dispatched/assigned to check access lists and router configurations of routers router 422*a* and/or router 422*b*.

If diagnostic controller 109 determines at block 229 that a dynamic neighbor link is present at the interface of router 422*a* coupled to router 422*b*, diagnostic controller 109 may determine at block 271 whether the dynamic link is either a Full state link or a two-way state link using information obtained at block 227. If diagnostic controller 109 determines that the dynamic link is neither a full state link nor a two-way state link at block 271, dynamic controller 109 delays for a period of time (e.g., 30 seconds) before instructing data collection interface 111 to execute a second OSPF neighbor command (using the same process ID and IP address that were used at block 227). At block 257 (following block 273), diagnostic controller 109 may determine (based on neighbor information from an interface of router 422*a* coupled to router 422*b* obtained at block 273) if a state of the dynamic link is either exstart, exchange, down, or null. If the state is either exstart, echange, down, or null at block 275, operations of blocks 239-267 may be performed as discussed above.

If the state is none of exstart, echange, down, or null at block 275, diagnostic controller 109 may determine at block 277 if the dynamic link is either a full state dynamic link or a two-way state dynamic link. If diagnostic controller 109 determines at block 277 that the dynamic link is neither a full state dynamic link nor a two-way state dynamic link, diagnostic controller 109 may determine at block 279 if the dynamic link is in an initiate state. If diagnostic controller 109 determines that the dynamic link is in an initiate state at block 279, diagnostic controller 109 may inform work center 115 of the initiate state of the dynamic link at block 281 so that a Tier2 technician may be dispatched/assigned to check OSPF authentication for router configuration for router 422*a*.

At block 283, diagnostic controller 109 may determine if the dynamic link is in a loading state. If the dynamic link is not in a loading state, diagnostic controller 109 may inform work center 115 that the dynamic link is not in a loading state at block 285 so that a Tier2 technician may be dispatched/assigned to verify OSPF and router configurations for router 422*a*. If the dynamic link is in a loading state, diagnostic controller 109 may instruct data collection interface 111 to execute a Show IP OSPF request-list with neighbor router ID (RID) and interface to obtain any corrupted Link State Advertisements (LSAs) at block 287, and to execute a Show IP OSPF log with neighbor router ID (RID) and interface to get event log data (e.g., OSPF-4-badisatypemsg) at block 289. In addition, diagnostic controller 109 and/or data collection interface 111 may check Maximum Transmit Unit (MTU) values of coupled interfaces of router 422*a* and router 422*b* to determine if there is a mismatch. Diagnostic controller 109 may provide information obtained at blocks 287, 289, and/or 291 to work center 115 at block 293 so that a Tier2 technician may be dispatched/assigned to check any LSA and/or MTU mismatch problems.

If diagnostic controller 109 determines that the dynamic link is either a full state link or a two-way state link at block 271 or at block 277, diagnostic controller 109 and/or data collection interface 111 may check network type conditions at block 295. If the neighbor link is a Point-to-Point Protocol (PPP) link, a Designated Router (DR) link, and/or a Backup Designated Router (BDR) link, the neighbor link should be a full state link. If the neighbor link is a broadcast or non-broadcast link, the neighbor link should be a two-way state link. If either of the conditions of block 295 is met at block 297, diagnostic controller 109 may inform work center 115 at block 299 that no problem has been found with OSPF link OSPF2 at router 422*a* so that work center may automatically close the trouble ticket previously generated by trouble ticketing system 107.

If neither of the conditions of block 295 is met at block 297, diagnostic controller 109 and/or data collection interface 111 may check coupled interfaces of routers 422*a* and 422*b* for network type and priority at block 301. If priority is zero for both of the coupled interfaces of routers 422*a* and 422*b* at block 303, diagnostic controller 109 may inform work center 115 that priority is zero so that work center may dispatch a Tier2 technician verify that the OSPF priority is 0 and to change the priority to 1 to make Designated Router (DR) and Backup Designated Router (BDR) at block 305. If priority is not zero for both of the coupled interfaces of routers 422*a* and 422*b* at block 303, diagnostic controller 109 may inform work center 115 at block 285 so that work center 115 may assign a Tier2 technician to verify OSPF and router configurations.

Operations of trouble shooting an OSPF link between two different customer edge routers through a network have been discussed above with respect to FIGS. 1 and 2 for OSPF link OSPF2 through provider edge routers 422*a* and 422*b* between customer edge routers CER2 and CER4. More particularly, operations of FIG. 2 have been discussed with respect to provider edge router 422*a* coupled to customer edge router CER2 at a location where the customer complaint originated. If operations of FIG. 2 are completed for provider edge router 422*a* without isolation an OSPF problem (e.g., at block 299), operations of FIG. 2 may be repeated at a next provider router in the OSPF link between customer edge routers (e.g., provider edge router 422*b* between customer edge routers CER2 and CER4). Moreover, operations of FIG. 2 may be initiated at provider edge router 422*b* for OSPF link OSPF2 if the customer complaint originated at location serviced by customer edge router CER4.

Figure 2A:
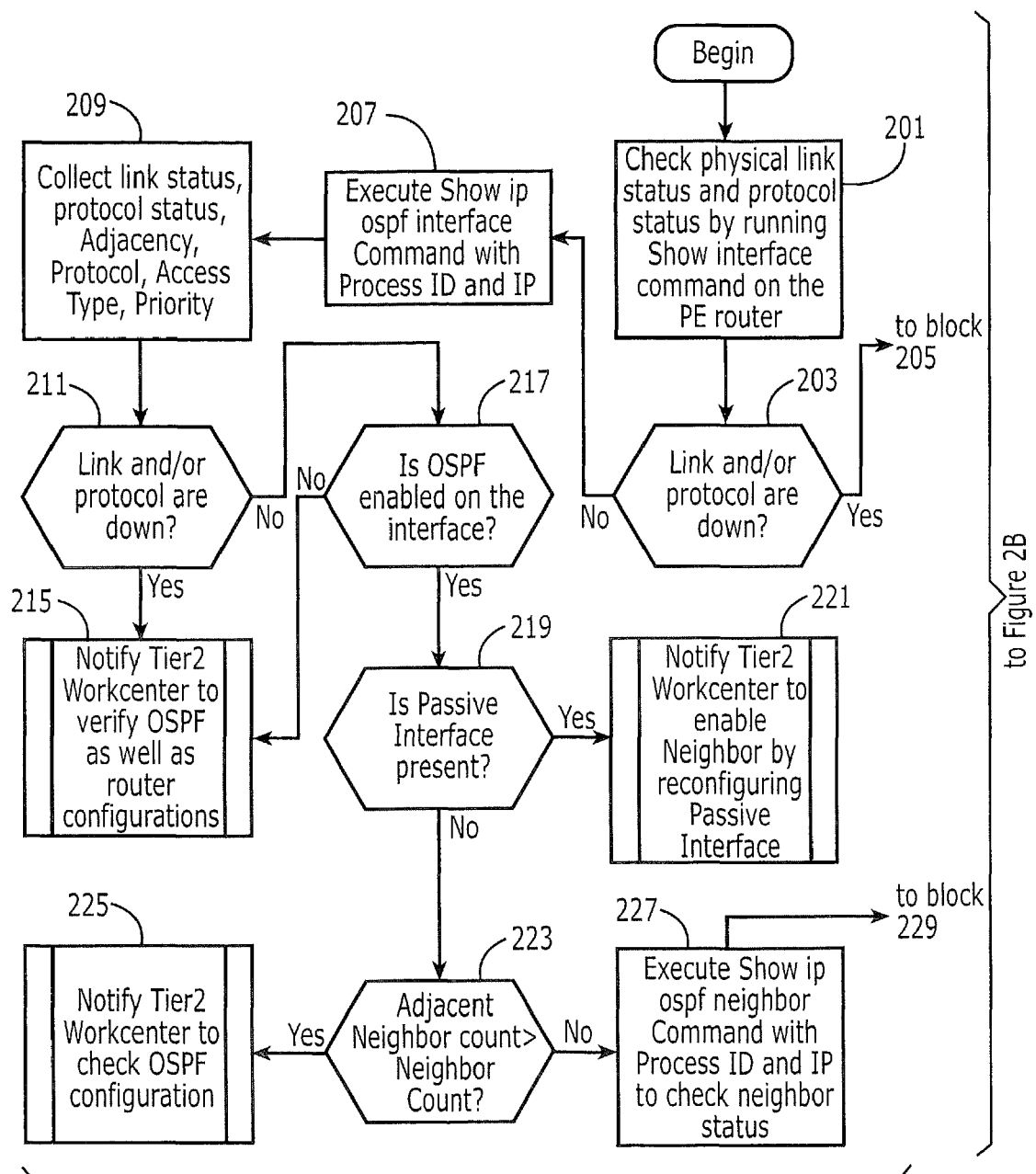
FIG. 2 is a flow chart illustrating operations of a diagnostic system configured to automatically identify OSPF protocol problems in a network.
Figure 2:
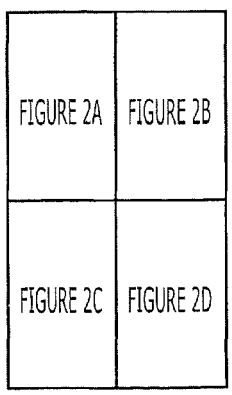
Figure 2B:
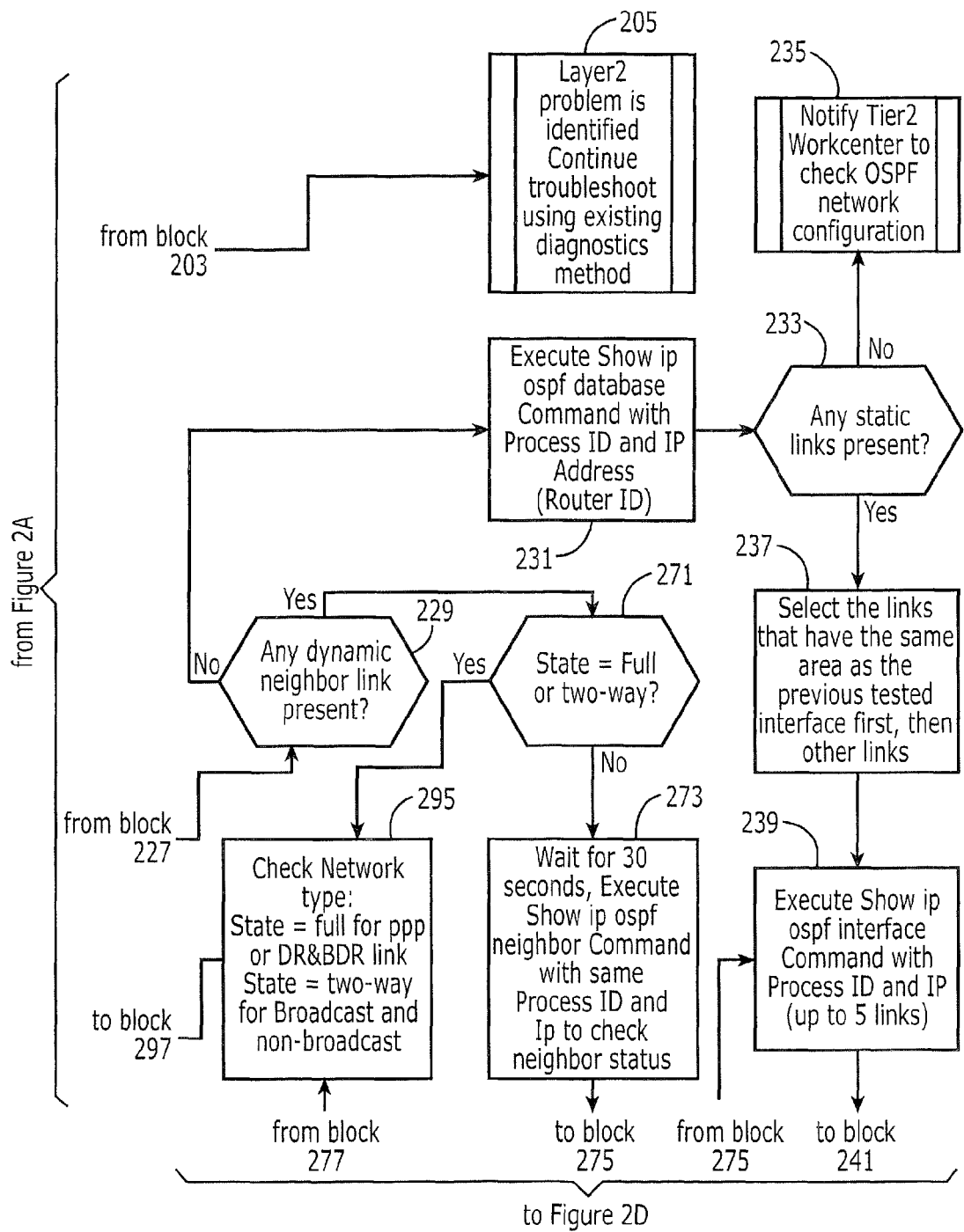
Figure 2C:
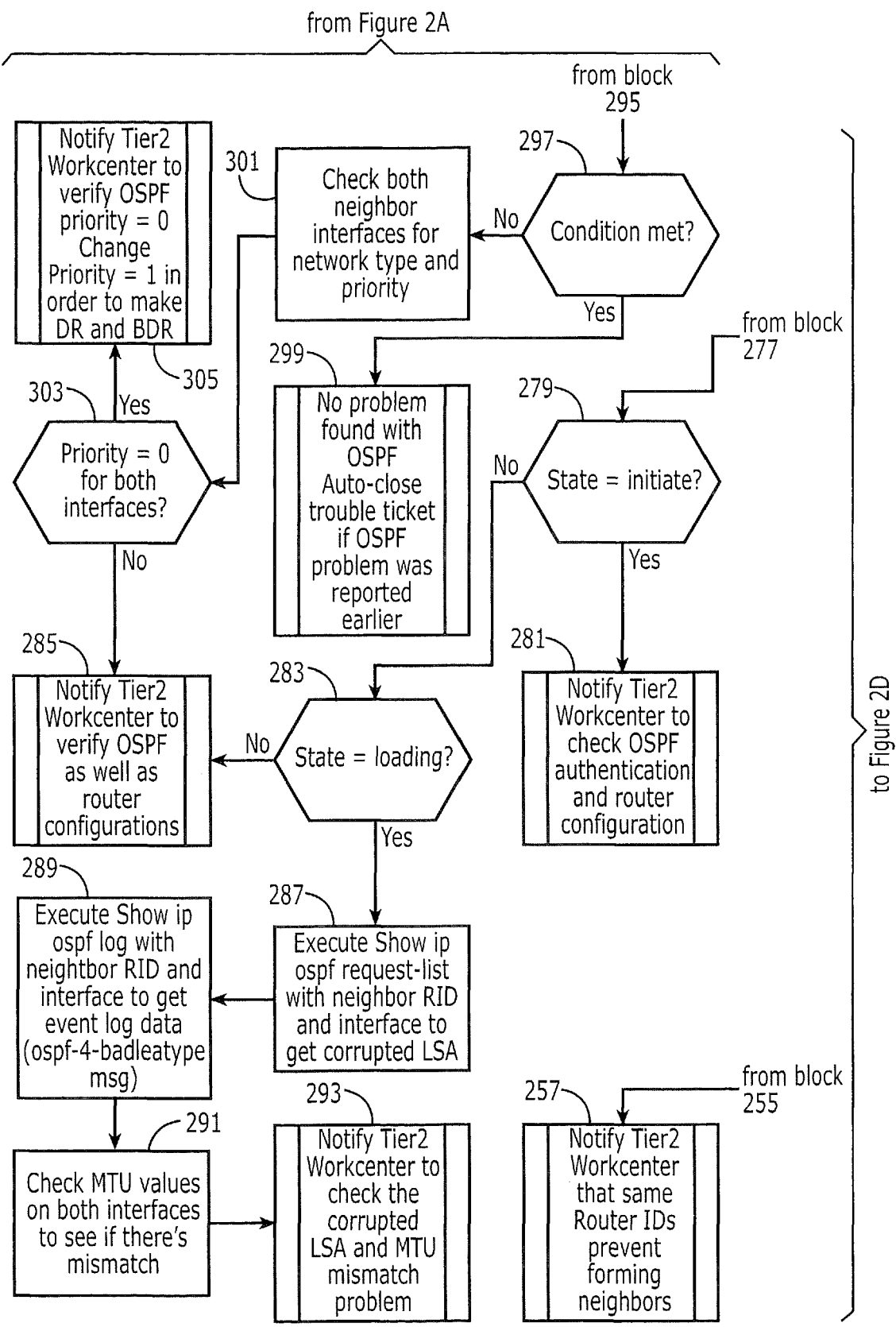
Figure 2D:
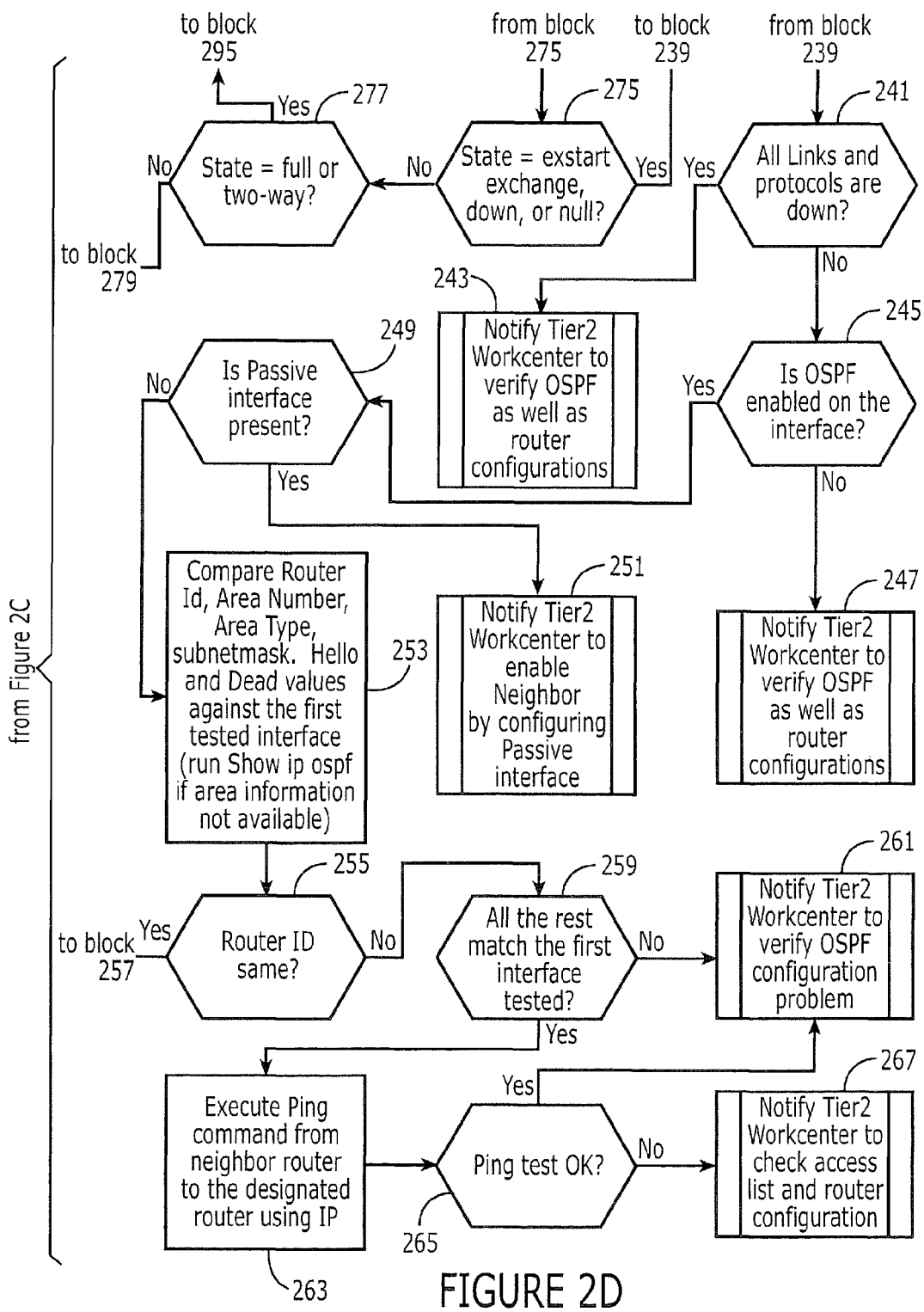

While operations of FIG. 2 have been discussed with respect to OSPF link OSPF2 implemented using two provider routers 422*a* and 422*b*, operations of FIG. 2 may be used to troubleshoot OSPF links implemented using any number of provider routers, such as OSPF link OSPF1 implemented using provider routers 421, 431, 432, and 422*c* coupled between customer edge routers CER1 and CER 6. If a customer complaint is originated at a location serviced by customer edge router CER1, for example, diagnostic system 110 may first perform operations of FIG. 2 with respect to provider edge router 421*a*. If no problem is identified at provider edge router 421*a*, diagnostic system 110 may then perform operations of FIG. 2 with respect to router 431. If no problem is identified at router 431, diagnostic system 110 may then perform operations of FIG. 2 with respect to router 432. If no problem is identified at router 432, diagnostic system may then perform operations of FIG. 2 with respect to router 422*c*. Accordingly, operations of FIG. 2 may be performed to diagnose OSPF problems for OSPF links provided using any number of network service provider routers.

Operations of FIG. 2 may thus be initiated in response to a customer IP address (identifying a customer edge router servicing a customer location from which a service failure has been reported) and a process ID (identifying an OSPF circuit related to the reported service failure) being provided to trouble ticketing system 107 and/or diagnostic system 110. Diagnostic system 110 may then automatically perform operations/decisions/notifications/etc. of FIG. 2 without user/human intervention. Diagnostic system 110 may thus automatically perform operations of FIG. 2 without user/human intervention from receipt of a customer IP address and a process ID until after generation of a notification.

There have been disclosed embodiments in the drawings and specification. However, many variations and modifications can be made to these embodiments without departing from the principles disclosed herein. All such variations and modifications are intended to be included herein within the scope of this disclosure, as set forth in the following claims. While particular arrangements of routers, networks, network elements, etc. and paths therebetween are discussed by way of example with respect to FIG. 1, embodiments may be implemented, for example, using other arrangements and/or numbers of elements and/or different paths therebetween.

That which is claimed is:

1. A data communications system comprising:
a network including a plurality of network provider routers configured to support Open Shortest Path First circuits between customer edge routers outside the network;
an automated diagnostic system coupled to the network provider routers wherein the automated diagnostic system is configured to automatically initiate one or more inquiries of one or more of the network provider routers in response to a customer Internet Protocol address identifying a customer edge router servicing a customer location from which a service failure has been reported and a circuit address identifying an Open Shortest Path First circuit related to the reported service failure, to automatically process results of the one or more inquiries to automatically identify whether an Open Shortest Path First protocol problem is present in the network, and to automatically generate a notification when an Open Shortest Path First problem is identified in the network, wherein the automated diagnostic system is configured to automatically initiate one or more inquiries of one or more routers of the network by automatically initiating a Show Internet Protocol interface command for an interface of a provider edge router of the network that is coupled to the customer edge router, wherein the automated diagnostic system configured to automatically process results of the one or more inquiries by automatically determining whether a physical link between the interface of the provider edge router and the customer edge router is down based on information received at the automated diagnostic system responsive to the Show Internet Protocol interface command, wherein the automated diagnostic system is configured to automatically generate the notification at the automated diagnostic system by automatically notifying a work center that the physical link between the interface of the provider edge router and the customer edge router is down in response to determining that the physical link is down, and wherein in response to determining that the physical link is not down, the automated diagnostic system is configured to automatically initiate a subsequent inquiry of the provider edge router of the network, to automatically process results of the subsequent inquiry to automatically identify whether an Open Shortest Path First protocol problem is present in the network, and to automatically generate a notification when an Open Shortest Path First problem is identified in the network.

2. A data communication system according to claim 1 wherein the automated diagnostic system is configured to automatically initiate one or more inquiries of one or more of the network provider routers by automatically initiating one or more Open Shortest Path First Show commands with respect to the one or more routers of the network.

3. A data communication system according to claim 1,
wherein the automated diagnostic system is configured to automatically process results of the one or more inquiries by automatically determining whether a logical link between the interface of the provider edge router and the customer edge router is down based on information received responsive to the Show Internet Protocol Open Shortest Path First interface command, wherein the automated diagnostic system is configured to automatically generate the notification by automatically notifying the work center that the logical link between the interface of the provider edge router and the customer edge router is down in response to determining that the logical link is down, and wherein in response to determining that the logical link is not down, the automated diagnostic system is configured to automatically initiate the subsequent inquiry of the provider edge router of the network, to automatically process results of the subsequent inquiry to automatically identify whether the Open Shortest Path First protocol problem is present in the network, and to automatically generate the notification at the automated diagnostic system when the Open Shortest Path First problem is identified in the network.

4. A data communication system according to claim 1,
wherein the automated diagnostic system is configured to automatically process results of the one or more inquiries by automatically determining whether any mismatches are present in Open Shortest Path First settings of the interface of the provider edge router coupled to the customer edge router based on information received responsive to the Show Internet Protocol Open Shortest Path First interface command, wherein the automated diagnostic system is configured to automatically generate the notification by automatically notifying the work center of a mismatch in the Open Shortest Path First settings of the interface of the provider edge router that is coupled to the customer edge router in response to determining that the mismatch is present, and wherein in response to determining that the mismatch is not present, the automated diagnostic system is configured to automatically initiate the subsequent inquiry of the provider edge router of the network, to automatically process results of the subsequent inquiry to automatically identify whether the Open Shortest Path First protocol problem is present in the network, and to automatically generate a notification when the Open Shortest Path First problem is identified in the network.

5. A data communication system according to claim 1 wherein the Open Shortest Path First circuit is supported using a first provider router coupled between the customer edge router and a second provider router,
wherein the automated diagnostic system is configured to automatically initiating one or more inquiries of one or more routers of the network by automatically initiating a Show Internet Protocol Open Shortest Path First database command for an interface of the first provider router that is coupled to the second provider router, wherein the automated diagnostic system is configured to automatically process results of the one or more inquiries by automatically determining whether any neighbor links are present at the interface of the first provider router that is coupled to the second provider router based on information received responsive to the Show Internet Protocol Open Shortest Path First database command, wherein the automated diagnostic system is configured to automatically generate the notification by automatically notifying the work center that no neighbors are present at the interface of the first provider router in response to determining that no neighbor links are present, and wherein in response to determining that neighbors are present, the automated diagnostic system is configured to automatically initiate a subsequent inquiry of the first and second provider router of the network, to automatically process results of the subsequent inquiry to automatically identify whether an Open Shortest Path First protocol problem is present in the network, and to automatically generate a notification when an Open Shortest Path First problem is identified in the network.

6. A data communication system according to claim 1 wherein the Open Shortest Path First circuit is supported using a first provider router coupled between the customer edge router and a second provider router,
wherein the automated diagnostic system is configured to automatically initiate one or more inquiries of one or more routers of the network by automatically initiating Show Internet Protocol Open Shortest Path First database commands for coupled interfaces of the first and second provider routers, wherein the automated diagnostic system is configured to automatically process results of the one or more inquiries by automatically determining whether a mismatch of area numbers for the coupled interfaces of the first and second provider routers exists based on information received responsive to the Show Internet Protocol Open Shortest Path First database commands, and wherein the automated diagnostic system is configured to automatically generate the notification by automatically notifying the work center that there is a mismatch of area numbers in response to determining that such a mismatch exists.

7. A computer program product configured to identify an Open Shortest Path First protocol problem in a network including an automated diagnostic system coupled to provider routers of the network, the computer program product comprising a non-transitory computer useable storage medium having computer-readable program code embodied in the medium, the computer-readable program code comprising:

computer-readable program code that is configured to automatically initiate at the automated diagnostic system one or more inquiries of one or more routers of the network in response to a customer Internet Protocol address identifying a customer edge router servicing a customer location from which a service failure has been reported and a circuit address identifying an Open Shortest Path First circuit related to the reported service failure;

computer-readable program code that is configured to automatically process results of the one or more inquiries at the automated diagnostic system to automatically identify whether an Open Shortest Path First protocol problem is present in the network; and computer-readable program code that is configured to automatically generate a notification at the automated diagnostic system when an Open Shortest Path First problem is identified in the network;

wherein the computer-readable program code is configured to automatically initiate one or more inquiries of one or more routers of the network by automatically initiating at the automated diagnostic system a Show Internet Protocol interface command for an interface of a provider edge router that is coupled to the customer edge router, wherein the computer-readable program code is configured to automatically process results of the one or more inquiries by automatically determining whether a physical link between the interface of the provider edge router and the customer edge router is down based on information received at the automated diagnostic system responsive to the Show Internet Protocol interface command, wherein the computer-readable program code is configured to automatically generate the notification at the automated diagnostic system by automatically notifying a work center that the physical link between the interface of the provider edge router and the customer edge router is down in response to determining that the physical link is down, and wherein in response to determining that the physical link is not down, the computer-readable program code is configured to automatically initiate at the automated diagnostic system a subsequent inquiry of the provider edge router of the network, to automatically process results of the subsequent inquiry at the automated diagnostic system to automatically identify whether an Open Shortest Path First protocol problem is present in the network, and to automatically generate a notification at the automated diagnostic system when an Open Shortest Path First problem is identified in the network.

8. A computer program product according to claim 7 wherein the computer-readable program code is configured to automatically initiate one or more inquiries of one or more routers of the network by automatically initiating at the automated diagnostic system one or more Open Shortest Path First Show commands with respect to the one or more routers of the network.

9. A computer program product according to claim 7, wherein the computer-readable program code is configured to automatically process results of the one or more inquiries by automatically determining whether a logical link between the interface of the provider edge router and the customer edge router is down based on information received at the automated diagnostic system responsive to the Show Internet Protocol Open Shortest Path First interface command, wherein the computer-readable program code is configured to automatically generate the notification at the automated diagnostic system by automatically notifying the work center that the logical link between the interface of the provider edge router and the customer edge router is down in response to determining that the logical link is down, and wherein in response to determining that the logical link is not down, the computer-readable program code is configured to automatically initiate at the automated diagnostic system the subsequent inquiry of the provider edge router of the network, to automatically process results of the subsequent inquiry at the automated diagnostic system to automatically identify whether the Open Shortest Path First protocol problem is present in the network, and to automatically generate the notification at the automated diagnostic system when the Open Shortest Path First problem is identified in the network.

10. A computer program product according to claim 7, wherein the computer-readable program code is configured to automatically process results of the one or more inquiries by automatically determining whether any mismatches are present in Open Shortest Path First settings of the interface of the provider edge router coupled to the customer edge router based on information received at the automated diagnostic system responsive to the Show Internet Protocol Open Shortest Path First interface command, wherein the computer-readable program code is configured to automatically generate the notification at the automated diagnostic system by automatically notifying the work center of a mismatch in the Open Shortest Path First settings of the interface of the provider edge router that is coupled to the customer edge router in response to determining that the mismatch is present, and wherein in response to determining that a mismatch is not present, the computer-readable program code is configured to automatically initiate at the automated diagnostic system the subsequent inquiry of the provider edge router of the network, to automatically process results of the subsequent inquiry at the automated diagnostic system to automatically identify whether the Open Shortest Path First protocol problem is present in the network, and to automatically generate a notification at the automated diagnostic system when the Open Shortest Path First problem is identified in the network.

11. A computer program product according to claim 7, wherein the Open Shortest Path First circuit is supported using a first provider router coupled between the customer edge router and a second provider router, wherein the computer-readable program code is configured to automatically initiate one or more inquiries of one or more routers of the network by automatically initiating at the automated diagnostic system a Show Internet Protocol Open Shortest Path First (OSPF) database command for an interface of the first provider router that is coupled to the second provider router, wherein the computer-readable program code is configured to automatically process results of the one or more inquiries by automatically determining whether any neighbor links are present at the interface of the first provider router that is coupled to the second provider router based on information received at the automated diagnostic system responsive to the Show Internet Protocol Open Shortest Path First database command, wherein the computer-readable program code is configured to automatically generate the notification at the automated diagnostic system by automatically notifying the work center that no neighbors are present at the interface of the first provider router in response to determining that no neighbor links are present, and wherein in response to determining that neighbors are present, the computer-readable program code is configured to automatically initiate at the automated diagnostic system a subsequent inquiry of the first and second provider router of the network, to automatically process results of the subsequent inquiry at the automated diagnostic system to automatically identify whether an Open Shortest Path First protocol problem is present in the network, and to automatically generating a notification at the automated diagnostic system when an Open Shortest Path First problem is identified in the network.

12. A computer program product according to claim 7, wherein the Open Shortest Path First circuit is supported using a first provider router coupled between the customer edge router and a second provider router, wherein the computer-readable program code is configured to automatically initiate one or more inquiries of one or more routers of the network by automatically initiating at the automated diagnostic system Show Internet Protocol Open Shortest Path First database commands for coupled interfaces of the first and second provider routers, wherein the computer-readable program code is configured to automatically process results of the one or more inquiries by automatically determining whether a mismatch of area numbers for the coupled interfaces of the first and second provider routers exists based on information received responsive to the Show Internet Protocol Open Shortest Path First database commands, and wherein the computer-readable program code is configured to automatically generate the notification at the automated diagnostic system by automatically notifying the work center that there is a mismatch of area numbers in response to determining that such a mismatch exists.

13. A method of automatically identifying an Open Shortest Path First protocol problem in a network including an automated diagnostic system coupled to provider routers of the network, the method comprising:

automatically initiating at the automated diagnostic system one or more inquiries of one or more routers of the network in response to a customer Internet Protocol address identifying a customer edge router servicing a customer location from which a service failure has been reported and a circuit address identifying an Open Shortest Path First circuit related to the reported service failure;

automatically processing results of the one or more inquiries at the automated diagnostic system to automatically identify whether an Open Shortest Path First protocol problem is present in the network; and automatically generating a notification at the automated diagnostic system when an Open Shortest Path First problem is identified in the network;

wherein automatically initiating one or more inquiries of one or more routers of the network comprises automatically initiating at the automated diagnostic system a Show Internet Protocol interface command for an interface of a provider edge router that is coupled to the customer edge router, wherein automatically processing results of the one or more inquiries comprises automatically determining whether a physical link between the interface of the provider edge router and the customer edge router is down based on information received at the automated diagnostic system responsive to the Show Internet Protocol interface command, wherein automatically generating the notification at the automated diagnostic system comprises automatically notifying a work center that the physical link between the interface of the provider edge router and the customer edge router is down in response to determining that the physical link is down, wherein in response to determining that the physical link is not down, the method further comprises:

automatically initiating at the automated diagnostic system a subsequent inquiry of the provider edge router of the network, automatically processing results of the subsequent inquiry at the automated diagnostic system to automatically identify whether an Open Shortest Path First protocol problem is present in the network; and automatically generating a notification at the automated diagnostic system when an Open Shortest Path First problem is identified in the network.

14. A method according to claim 13 wherein automatically initiating one or more inquiries of one or more routers of the network comprises automatically initiating at the automated diagnostic system one or more Open Shortest Path First Show commands with respect to the one or more routers of the network.

15. A method according to claim 13, wherein automatically processing results of the one or more inquiries comprises automatically determining whether a logical link between the interface of the provider edge router and the customer edge router is down based on information received at the automated diagnostic system responsive to the Show Internet Protocol Open Shortest Path First interface command, and wherein automatically generating the notification at the automated diagnostic system comprises automatically notifying the work center that the logical link between the interface of the provider edge router and the customer edge router is down in response to determining that the logical link is down, wherein in response to determining that the logical link is not down, the method further comprises:

automatically initiating at the automated diagnostic system the subsequent inquiry of the provider edge router of the network;

automatically processing results of the subsequent inquiry at the automated diagnostic system to automatically identify whether the Open Shortest Path First protocol problem is present in the network; and automatically generating a notification at the automated diagnostic system when the Open Shortest Path First problem is identified in the network.

16. A method according to claim 13, wherein automatically processing results of the one or more inquiries comprises automatically determining whether any mismatches are present in Open Shortest Path First settings of the interface of the provider edge router coupled to the customer edge router based on information received at the automated diagnostic system responsive to the Show Internet Protocol Open Shortest Path First interface command, and wherein automatically generating the notification at the automated diagnostic system comprises automatically notifying the work center of a mismatch in the Open Shortest Path First settings of the interface of the provider edge router that is coupled to the customer edge router in response to determining that the mismatch is present, wherein in response to determining that a mismatch is not present, the method further comprises:

automatically initiating at the automated diagnostic system the subsequent inquiry of the provider edge router of the network;

automatically processing results of the subsequent inquiry at the automated diagnostic system to automatically identify whether the Open Shortest Path First protocol problem is present in the network; and automatically generating a notification at the automated diagnostic system when the Open Shortest Path First problem is identified in the network.

17. A method according to claim 13, wherein the Open Shortest Path First circuit is supported using a first provider router coupled between the customer edge router and a second provider router, wherein automatically initiating one or more inquiries of one or more routers of the network comprises automatically initiating at the automated diagnostic system a Show Internet Protocol Open Shortest Path First database command for an interface of the first provider router that is coupled to the second provider router, wherein automatically processing results of the one or more inquiries comprises automatically determining whether any neighbor links are present at the interface of the first provider router that is coupled to the second provider router based on information received at the automated diagnostic system responsive to the Show Internet Protocol Open Shortest Path First database command, and wherein automatically generating the notification at the automated diagnostic system comprises automatically notifying the work center that no neighbors are present at the interface of the first provider router in response to determining that no neighbor links are present, wherein in response to determining that neighbors are present, the method further comprises:

automatically initiating at the automated diagnostic system a subsequent inquiry of the first and second provider router of the network;

automatically processing results of the subsequent inquiry at the automated diagnostic system to automatically identify whether an Open Shortest Path First protocol problem is present in the network; and automatically generating a notification at the automated diagnostic system when an Open Shortest Path First problem is identified in the network.

\* \* \* \* \*